Jan. 17, 1950     C. F. RUBEL     2,494,901
SEWING MACHINE

Filed Oct. 12, 1946     7 Sheets-Sheet 1

INVENTOR.
Charles F. Rubel
BY
ATTORNEY

Jan. 17, 1950  C. F. RUBEL  2,494,901
SEWING MACHINE
Filed Oct. 12, 1946  7 Sheets-Sheet 5
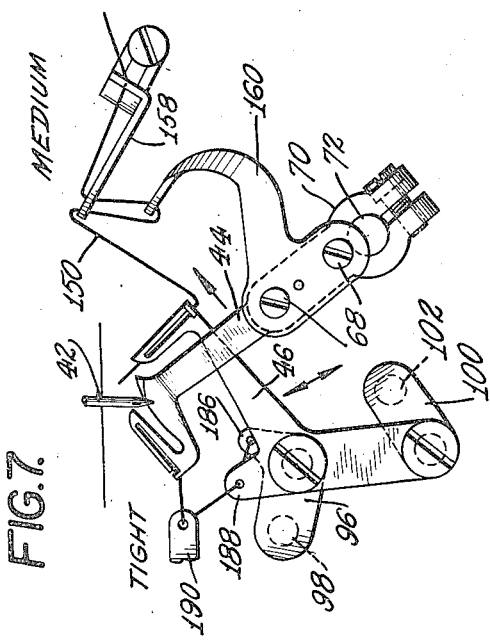
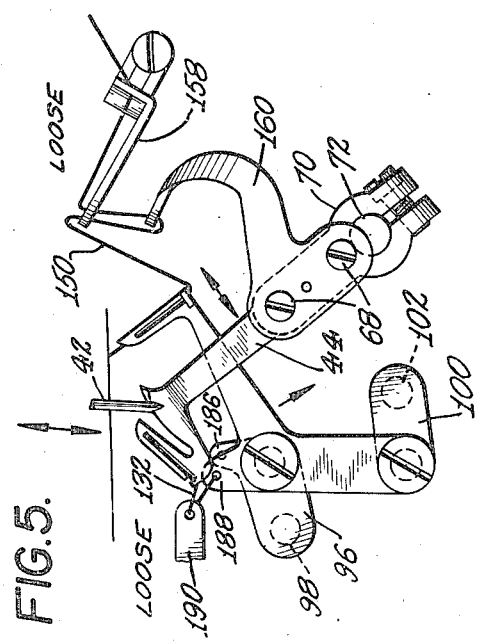
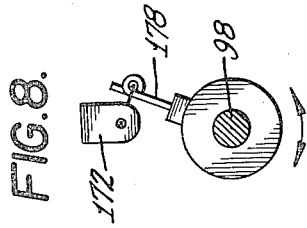
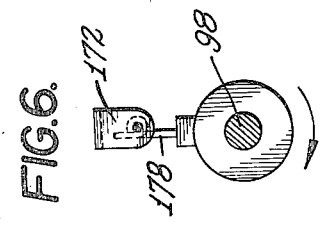
INVENTOR.
Charles F. Rubel
BY
H. C. Liesenz
ATTORNEY

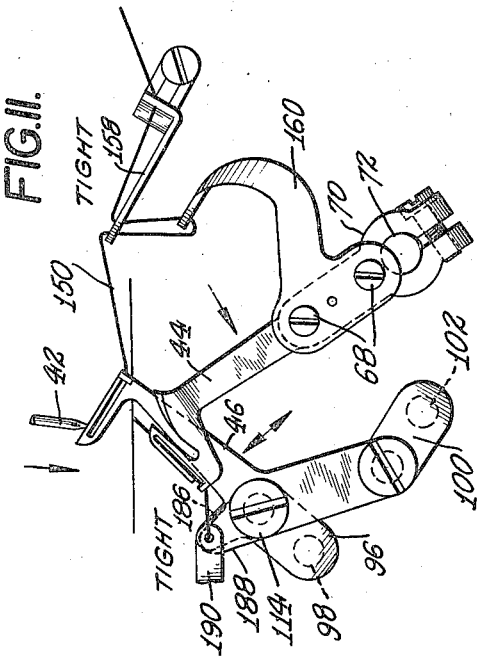
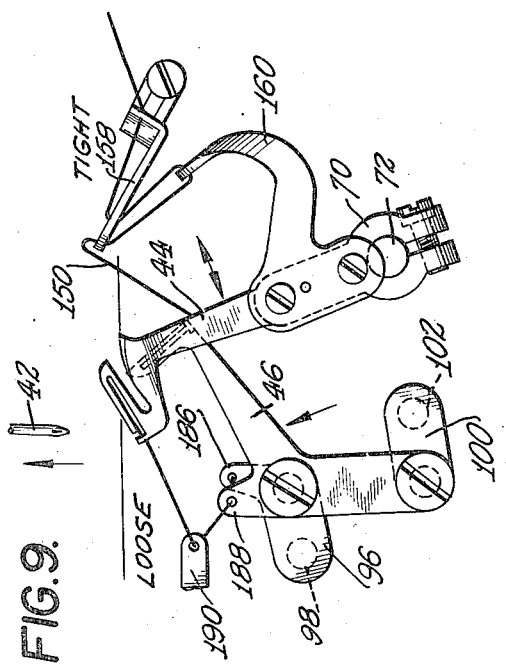
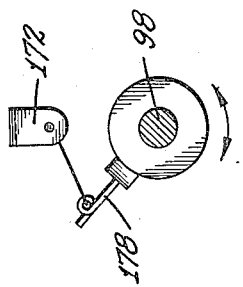
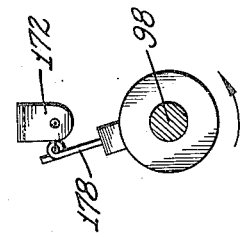

Jan. 17, 1950
C. F. RUBEL
2,494,901
SEWING MACHINE
Filed Oct. 12, 1946
7 Sheets-Sheet 7
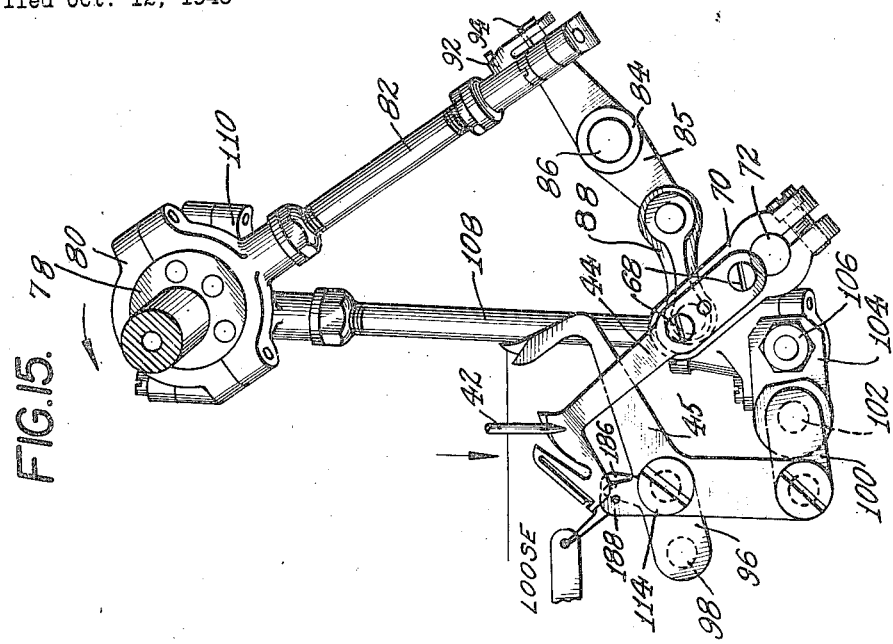
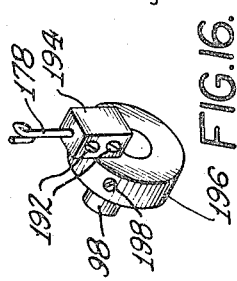
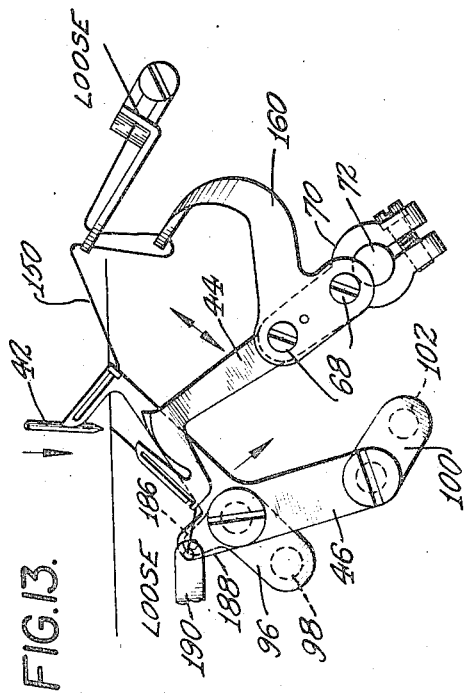
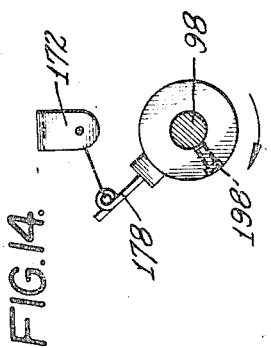
INVENTOR.
Charles F. Rubel
BY
H. E. Kiesenuf
ATTORNEY

UNITED STATES PATENT OFFICE 2,494,901

SEWING MACHINE

Charles F. Rubel, Chicago, Ill., assignor to Union Special Machine Company, Chicago, Ill., a corporation of Illinois Application October 12, 1946, Serial No. 702,928

13 Claims. (Cl. 112—162)

The present invention relates to improvements in looper thread handling mechanism for an overedge sewing machine, of which the stitch forming devices include a movable eye needle, an under looper and an overedge looper which cooperate to form a series of locked loop stitches passing from one side to the other of the work around the edge thereof.

While machines of the general type referred to are readily adaptable for the forming of a number of different stitches with one, two, or three threads, the present invention is concerned only with the organization of such a machine adapted for the formation of stitches with two or three threads and which is provided with either one or two thread carrying loopers.

It is a principal object of the invention to provide a novel construction and arrangement of the looper thread handling devices in an overedge sewing machine of the general type described, which will provide for the more efficient and accurate control of a looper thread or threads under the most severe conditions of high speed operation to insure the formation of tight, well-formed stitches, and without excessive straining or breakage of thread.

It is another object of the invention to provide a simplified and improved form of thread handling mechanism for a thread carrying looper in which the motions of the moving parts of another looper mechanism are utilized and combined with the movements of the thread carrying looper for the taking up and control of the looper thread.

It is a further object of the invention to provide in an overedge sewing machine of this general description, a novel and improved arrangement of the overedge looper thread handling mechanism in which a thread guide moving with the under looper arm acts in combination with the overedge looper and suitable fixed guiding means on the machine to control and to take up the overedge looper thread.

It is another object of the invention to provide in an overedge sewing machine of this description, a novel and improved arrangement of the under looper thread handling mechanism in which the desired take-up action is imparted to the under looper thread through the cooperative action of thread guides associated with certain moving parts of the overedge looper mechanism with relation to the under looper and with relation to associated fixed guiding means on the machine.

It is another object of the invention to provide an improved means for the adjustment of the position of the overedge looper in accordance with the size of needle, which will permit such adjustment to be made without disturbance of related adjustments of the several operating parts of the overedge looper mechanism.

With these and other objects in view as may hereinafter appear, a feature of the invention consists in the construction and arrangement of the thread guiding means through which thread is supplied to a thread carrying under looper, said means including guides associated with the overedge looper lever, its more upwardly disposed supporting arm, and the stud to which said arm is secured to provide a more efficient and accurate take-up and control of the thread supplied to a thread carrying under looper. Specifically, in accordance with the invention, two adjacent thread eyes are provided in the overedge looper lever and in the upper supporting arm therefor respectively, and cooperate with two relatively stationary guides on the machine to take up the under looper thread during movement of the overedge looper from its raised overedge position in which the guides and thread eyes are in substantial alignment, to a position of maximum take-up when the overedge looper reaches the limit of its downward or retracting movement. The two adjacent thread eyes referred to, supported respectively on the overedge looper and on the supporting arm, are arranged to move away from their position of alignment as the overedge looper is retracted and their separation is the result of the movement of the parts about two different pivot points. Moreover, another eyelet, carried by the same stud which carries the upper supporting arm mentioned, is rocked in relation to other fixed guides to impart a further take-up action to the under looper thread. The net result is to effect a differential take-up of the under looper thread, the timing and extent of which is determined in part by the rocking movement of the upper stud with the extra eyelet and the supporting arm for the overedge looper and in part by the movement of the overedge looper itself. The arrangement of these thread eyes and cooperating stationary thread guides is such as to provide a maximum take-up of the under looper thread at those points in the operating cycle at which the overedge looper reaches each limit of its movement. The timing of the overedge looper mechanism, including the thread guiding means above referred to, with relation to the movements of the under looper is such as to cause tension to be applied to the under looper thread first during the upward movement of the under looper to tighten the previous stitch and to draw thread from the supply, and again during the downward movement of the under looper to tension the loop of under looper thread over the overedge looper, and thereafter to draw in and set the newly formed loop of under looper thread before the needle reaches the limit of its downward stroke preparatory for the forming of a new stitch.

Another feature of the invention consists in the provision of thread guiding means through which thread is supplied to a thread carrying overedge looper, said means including a thread arm rigidly secured to the under looper carrier which cooperates with fixed thread guiding means on the machine, and with the movements of the overedge looper to take up and to control the overedge looper thread. This take-up mechanism is constructed and arranged to provide a medium tension to the overedge looper thread when tension is first applied to the cooperating under looper thread during the upward movement of the under looper, this tension thereafter increasing to its maximum during movement of the overedge looper through the loop of under looper thread and as the overedge looper is moved to its extreme upper or overedge position. The tension on the overedge looper thread is then slacked off during the retracting movement of the overedge looper.

Another feature of the invention consists in the provision of a supporting block on which is mounted each of the upper and lower supporting studs for the overedge looper lever, and which is supported in a guideway for adjustment forwardly and rearwardly of the machine to permit of a quick and easy adjustment of the position of the overedge looper with relation to needles of different sizes.

The several features of the invention consists also in the devices, combinations, and arrangement of parts hereinafter described and claimed, which together with the advantages to be obtained thereby, will be readily understood by one skilled in the art from the following description taken in connection with the accompanying drawings, in which:

Figs. 5 to 14 inclusive, are somewhat diagrammatic views illustrating in a series of views the operation of the looper thread handling devices during the cycle of the needle and loopers in the forming of a three-thread overedge stitch;

Figs. 5 and 6 show the indicated parts in the position they assume when the needle is fully depressed, the under looper is retracted, and the overedge looper is approaching its retracted position;

Figs. 7 and 8 show the parts in the positions assumed when the needle starts to rise, the under looper is about to enter the needle loop, the overedge looper is fully retracted, and the adjustable thread eye shown in Fig. 8 has been moved to its limit in a clockwise direction;

Figs. 9 and 10 illustrate the parts in the positions assumed when the needle is still rising, the under looper is fully advanced, and the overedge looper is about to enter the under looper thread loop, while the adjustable thread eye shown in Fig. 10 has started to move to the left of the fixed guide;

Figs. 11 and 12 illustrate the positions assumed by the parts when the needle is descending and about to enter the overedge looper loop, the overedge looper is fully advanced, the under looper is almost fully retracted, and the adjustable thread eye shown in Fig. 12 is in its extreme take-up position in a counter-clockwise direction;

Figs. 13 and 14 illustrate the positions assumed by the parts when the needle is continuing its downward movement through the work, the overedge looper is beginning to be retracted, and the under looper has reached its fully retracted position, the thread eye shown in Fig. 14 having started its return movement in a clockwise direction;

Fig. 15 is a view of the needle and looper mechanisms in which the overedge thread carrying looper has been replaced by a spreader adapted for the formation of a two-thread overedge stitch, this view illustrating additionally the operating connections from the respective eccentrics on the main drive shaft for actuating the loopers; and Fig. 16 is a detail perspective view of the adjustable thread eye for controlling the under looper thread.

For purposes of illustration, the invention has been shown applied to an overedge stitching machine of the general type disclosed in the Christensen and Zeier Patent No. 1,751,508, granted March 25, 1930.

Figure 1:
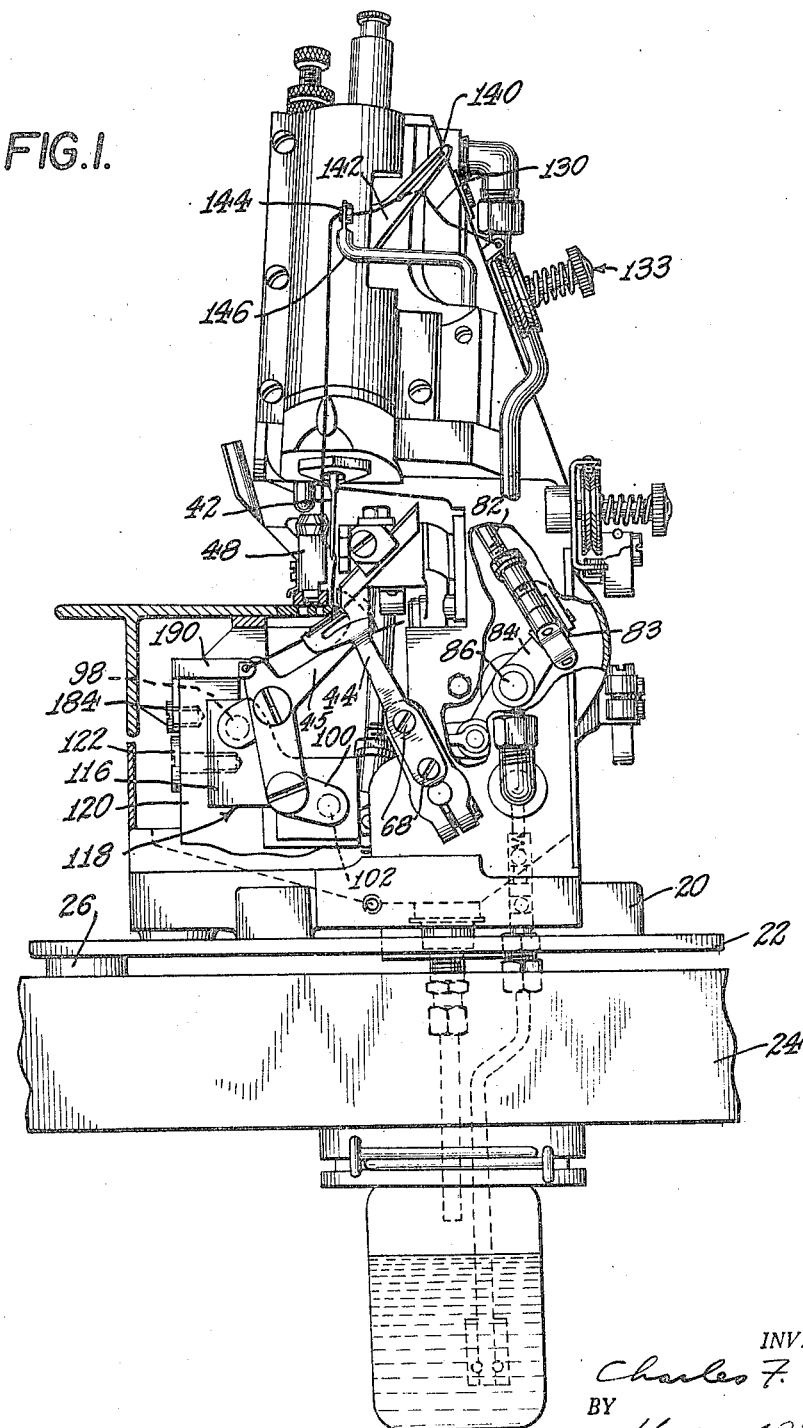
Fig. 1 is a view in front elevation of an overedge sewing machine embodying the several features of the invention, portions having been broken away to illustrate portions of the looper mechanisms.
Figure 2:
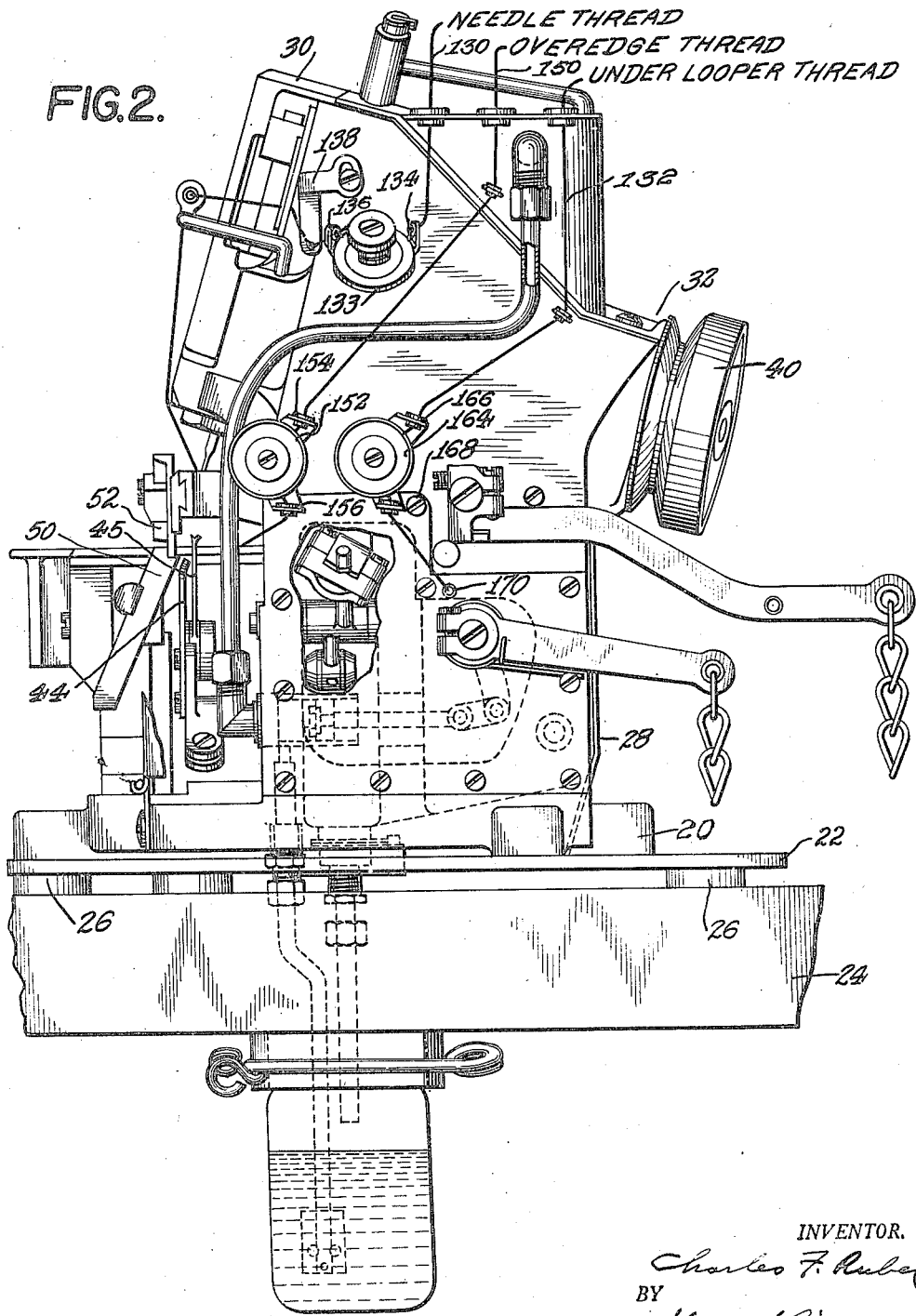
Fig. 2 is a view in right side elevation of the machine shown in Fig. 1, a portion of the casing having been removed and a portion broken away to illustrate parts of the looper mechanism shown in Fig. 1.
Figure 3:
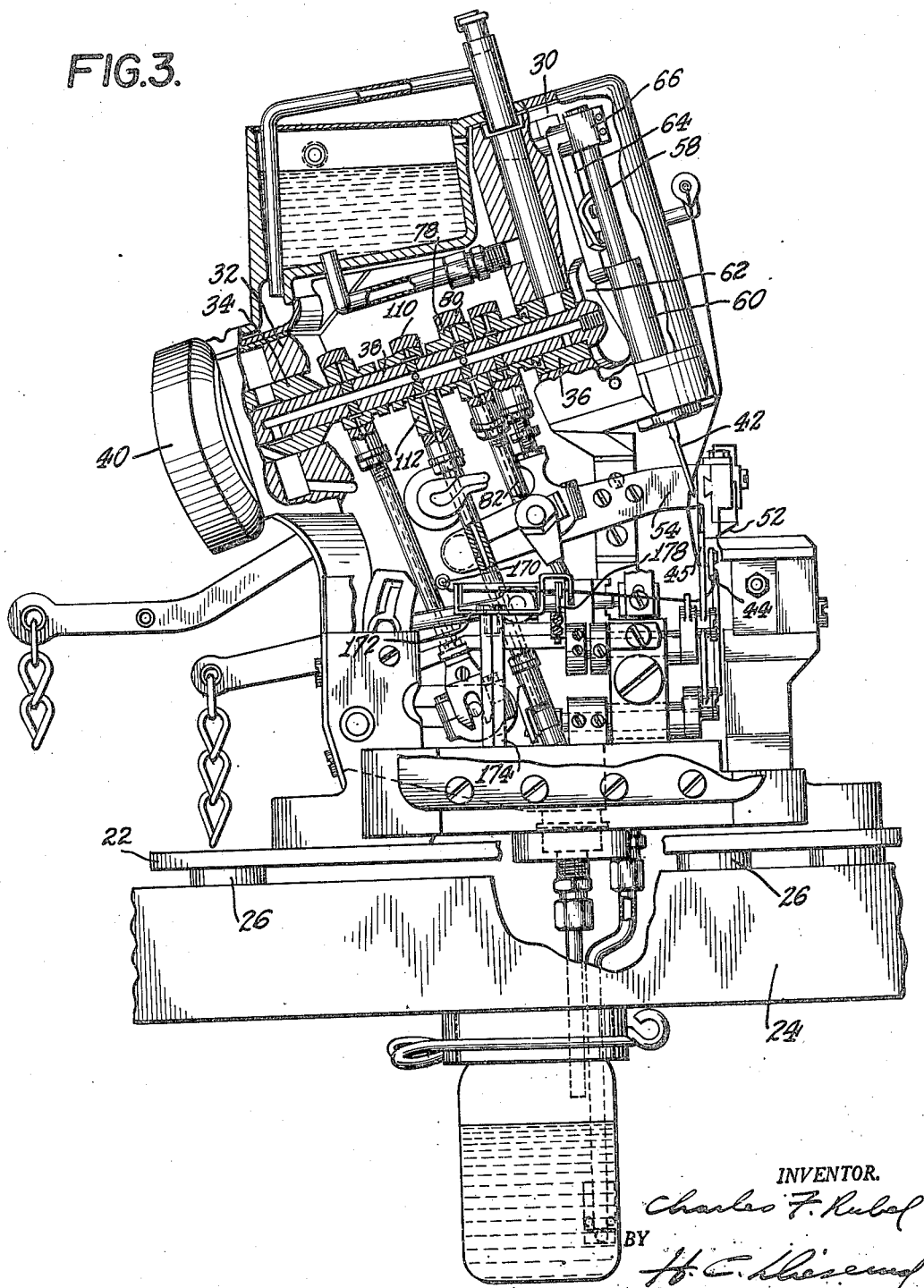
Fig. 3 is a view, partly in left side elevation and partly in vertical section, of the machine with portions of the casing broken away.

Reference is made to Figs. 1, 2, and 3 of the drawings. Briefly described, the machine includes a base 20 mounted on a plate 22, the plate being supported from a sewing table 24 by insulators or vibration absorbers 26. Rising from the base is a standard 28 with spaced front and rear projections 30 and 32 respectively, having inset bearing bushings 34 and 36 for a shaft 38 which is inclined somewhat to the horizontal, and to which at the left hand or rear end, as shown in Fig. 3, is secured a combined hand and belt wheel 40 so that the machine can be operated either manually or by a belt driven by appropriate means. The instrumentalities driven from the shaft 38 include a straight eye needle 42 which is arranged to reciprocate in a plane normal to the axis of drive shaft 38 and to enter the work at an angle, a thread carrying under looper 44, and an overedge looper which is the embodiment of the invention illustrated in Figs. 1 to 4 inclusive, and Fig. 15, takes the form of a loop spreader 45. In the diagrammatic Figs. 5, 7, 9, 11, and 13, a thread carrying overedge looper 46 is shown. Cooperating with these instrumentalities is a presser foot 48, a work feed mechanism comprising one or more feed dogs (not shown) carried by a feed bar 49 (Fig. 4) which engage and feed the work in cooperation with the presser foot, and edge trimming mechanism consisting of a fixedly supported under knife 50 and a co-operating reciprocating knife 52 adjustably supported in a trimmer lever 54. Inasmuch as the presser foot, work feed, and edge trimming mechanisms are particularly illustrated and described in the patent to Christensen, et al. above noted, and form specifically no part of the present invention, no detailed disclosure or description thereof is made herein.

The needle 42 is secured to a needle bar 58 which reciprocates in a fixed sleeve bearing 60. The needle bar 58 is connected to be driven from the shaft 38 by means of a crank 62 mounted on the forward end of the shaft and a connecting link 64 connected at its upper end with a block 66 on the needle bar 58.

The under looper 44 illustrated in the drawings (Figs. 3, 5, 7, 9, 11, and 13) as being of the thread carrying variety, is attached by screws 68 to a carrier arm 70 rigidly secured to the forward end of a stud 72 which is rotatably mounted in an axially adjustable sleeve bushing 74 in a wall 76 of the machine base 10. The stud 72 and under looper 44 are arranged to have imparted thereto an oscillatory movement from an eccentric 78 (Figs. 3 and 15) on the drive shaft 38, through connections which include an eccentric strap 80 and a pitman 82 which is connected at its lower end to a ball stud 83 (Figs. 4 and 15) on one arm of a rock member 84 supported on a shaft 86. A forked link 88 connects the free end of a downwardly extending arm 85 of member 84 with an upwardly extending arm 90 secured to the rocker stud 72. A forked member 92 secured to the lower end of the pitman 82 is arranged to straddle an extension 94 of the arm of member 84 in order to prevent undue vibration of the parts. The toggle action provided by member 84 and link 88 tends to produce a substantial dwell in the movement of the under looper at the limit of its retracting stroke and a relatively rapid movement of the looper during its loop-seizing and retracting movements.

Figure 4:
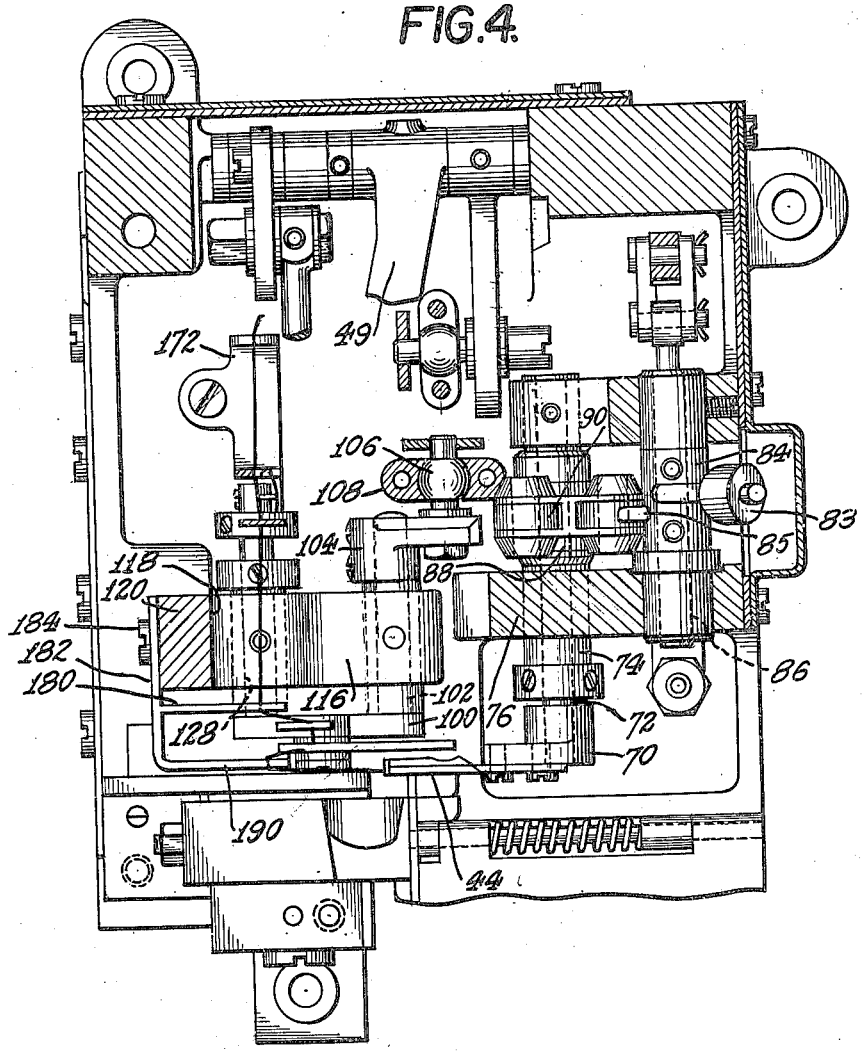
Fig. 4 is a horizontal sectional view through the base of the machine, taken below the table level and with certain parts omitted to illustrate particularly the supporting and actuating mechanism for the loopers.

The overedge looper arm 46 (Figs. 7, 9, and 11), or the spreader 45 (Figs. 1, 2, and 3), as shown in the drawings, is supported intermediate its length by a short link or arm 96 carried on a stud 98, and is supported at its lower end on a supporting arm 100 carried on a stud 102, to the inner end of which is secured a lever arm 104 (Fig. 4). The lever arm 104 is connected by a ball stud 106 with a strap at the lower end of a pitman 108. A strap 110 at the upper end of the pitman cooperates with an eccentric 112 on the drive shaft 37. The arrangement of the rock shaft 102, stud 98, and supporting links 100, 96 is such as to cause the overedge looper 46 first to be moved upwardly over the edge of the fabric, and then to be swung about its pivotal connection 114 with the supporting arm 96 in a counterclockwise direction as viewed in Fig. 1 to position its loop of thread for engagement by the descending needle.

In the illustrated form of the invention, an improved arrangement of the supporting and actuating mechanism for the overedge looper 46 is provided, which will permit of a simple and easy adjustment of the looper in accordance with different sizes of needle without disturbing the relation between the looper and its supporting and actuating means, thus also eliminating danger of binding of the parts. To this end, a supporting block 116 is provided which has formed therein journal bearings for the studs 98 and 102, and which is in turn mounted for adjustment forwardly and rearwardly of the machine in a guideway indicated at 118 (Figs. 1 and 4) formed in a bracket 120 rigidly secured to the machine frame. The supporting block 116 is secured in adjusted position to the bracket 120 by means of a clamping screw 122 which extends through a horizontally disposed slot in the bracket 120, and is screwthreaded into the block 116.

The present machine is equipped for the supply of three threads which include a needle thread 130, an overedge looper thread 150 and an under looper thread 132 (Fig. 5). The thread take-up and control devices through which the needle thread 130 is supplied to the needle include a thread tension 133 with thread guides 134, 136 through which the thread is drawn, a stationary thread eye 138 (Fig. 2) and an elongated thread eye 140 (Fig. 1) formed in a needle thread take-up arm 142 carried by the needle actuating link 64. The thread passes through the eye 140 to a thread eye 144 carried on a fixed bracket 146, and then downwardly along the outside of the machine casing to the needle 42.

The thread take-up and control devices through which the overedge looper thread 150 is supplied to the thread carrying overedge looper 46 include a thread tensioning device 152 and associated thread eyes 154, 156 mounted on the right side of the machine, a fixed thread guide 158 (Fig. 5), and a thread take-up arm 160 which is supported to move with the under looper 44. The overedge looper thread 150 passes from the tensioning device 152 and thread eye 156 to an eye in the fixed thread guide 158, thence downwardly to the thread take-up arm 160, back through a second thread eye in the fixed thread guide 158, and then to the overedge looper 46.

The thread take-up and control devices through which the under looper thread 132 is supplied to the thread carrying under looper 44 include a thread tension 164 and associated thread guides (Fig. 2) mounted on the right side of the machine, and a thread tube 170 which carries the thread transversely across the casing to the rear of the looper operating mechanism. A thread guide 172 (Figs. 3 and 4) mounted on a vertical bracket 174 and formed with transversely extending portions providing three aligned eyelets, carries the thread forwardly in cooperative relation with an interposed thread take-up in the form of a thread eye 178 (Figs. 3, 6, and 8) offset from but secured to the upper supporting stud 98 for the overedge looper arm 46. The thread then passes through a thread eye in a stationary arm 180 formed in a bracket 182 secured by a clamping screw 184 to the supporting block 120, thence to a second take-up device which comprises a thread eye 186 formed in an upward extension of the link 96 and a thread eye 188 forming an upward extension of the overedge looper lever 46. Thread 132 passes from the thread eye 188 through a thread eye in another stationary arm 190 of the bracket 182 and then to the under looper 44.

The thread eye 178 referred to, comprises a wire member adjustably secured by set screws 192 in a block 194 offset from a disc member 196 which is adjustably secured, by means of a set screw 198, on the stud 98 (Fig. 16). The thread eye 178 is thus adapted for adjustment radially, axially and angularly with relation to the stud 98, permitting an accurate adjustment of both the timing and extent of its thread take-up action.

The operation of the sewing and thread handling devices of the machine, including the needle and under and overedge loopers, and more particularly the operation of the under and overedge looper thread take-up devices for the formation of a three-thread overedge stitch, will be described in connection with the series of diagrammatic views (Figs. 5 to 14) inclusive of the drawings, of which Figs. 5 and 6 show the several operating parts in position at the beginning of the stitch forming cycle. The needle 42 is at this time in its lowermost work piercing position, while the under looper 44 is fully retracted and the overedge looper is approaching its fully retracted position. For this position of the parts, both the overedge looper thread 150 and the under looper thread 132 are loose.

The operation of the needle and under and overedge looper levers for the formation of a stitch is briefly as follows: Starting from the position shown in Fig. 5, the under looper lever is advanced first to engage the needle loop presented by the retracting needle as shown in Fig. 7, thereafter continuing its advancing movement to the position shown in Fig. 9, in which a loop of under looper thread is presented in the path of movement of the overedge looper, which in turn advances to engage thereon the loop of under looper thread and to present a loop of overedge looper thread to the needle while the under looper moves downwardly as indicated in Fig. 11. Finally, the overedge looper starts its retracting movement, as shown in Fig. 13, as the needle proceeds downwardly and the under looper is returned to its fully retracted position. In this sequence of operations, the under looper is retained in its fully retracted position through a substantial dwell period by the operation of its toggle driving connection, as indicated by the transition from Fig. 13 to Fig. 5, and is then caused to be advanced and retracted at a relatively rapid rate in order to provide for the most effective cooperation of these several thread handling devices.

The operation of the thread control and take-up devices for the overedge looper is briefly as follows: Starting with the position shown in Fig. 5, in which the overedge looper is approaching its retracted position, the under looper remains fully retracted and the associated take-up arm is at the limit of its movement toward the fixed thread arm, the overedge looper thread 150 is free of tension. As the under looper now moves upwardly and the overedge looper reaches the lower end of its movement, the overedge looper thread is placed under some tension by the continued clockwise movement of thread arm 160 and by the movement of the looper itself (see Fig. 7). Thereafter, as the overedge looper moves upwardly and laterally first to seize the loop of under looper thread (see Fig. 9) and thereafter into position to have its loop entered by the downwardly moving needle, the overedge looper thread 150 is held under a substantial tension which is maintained until the overedge looper reaches its maximum high position (see Fig. 11). The tension on the overedge looper thread is relieved as the overedge looper begins its retracting movement, and the needle then, upon its downward movement, passes through the loop which is formed in overedge looper thread. The overedge looper thread remains loose during the retracting stroke of the overedge looper through the positions illustrated in Figs. 13 and 5.

The thread control and take-up devices for the under looper thread are constructed and arranged to produce a condition of tension upon the under looper thread during a portion of the upward movement of the under looper lever which coincides with the movement of the overedge looper to its fully retracted position, and to again tension the thread during a portion of the downward movement of the under looper which coincides with the movement of the overedge looper to its extreme advanced overedge position. The tensioning of the under looper thread takes place during the early part of the upward movement of the under looper as it enters the needle loop as shown in Fig. 7. The tension on the under looper thread is again slacked off as the under looper reaches the limit of its advancing movement and starts to return, thus facilitating the movement of the overedge looper through the under looper thread loop. The under looper thread is again tensioned during a portion of the return movement of the under looper to the position shown particularly in Fig. 11, in order to cause the loop of under looper thread to be drawn firmly against the overedge looper, and thereafter to be fully taken in to set the stitch. The tension on the under looper thread is again slacked off as the under looper reaches its fully retracted position shown in Fig. 13.

For the fully retracted position of the overedge looper, a maximum take-up of the under looper thread is obtained as shown in Fig. 7, by the movement of the thread eyes 186, 188 out of alignment with each other and with the fixed thread guides 180, 190 (see Fig. 4). For this position of the parts, an additional take-up of the under looper thread is obtained by movement of the thread eye 178 some distance to the right of its in-line position with relation to the stationary thread guide 172 as shown in Fig. 8. For the fully advanced position of the overedge looper (see Fig. 11), a condition of maximum take-up to tighten the under looper thread is obtained by the movement of the rearwardly disposed thread eye 178 to its extreme position to the left as shown in Fig. 12. For this position of the overedge looper, the thread eyes 186, 188 are in substantial alignment with the stationary thread guides 180, 190, so that the amount of thread taken up is controlled entirely by the adjustment of the thread eye 178.

The differential movement of the thread eyes 186, 188 with relation to the fixed guides 180, 190, and with relation to eyelet 178 serves to provide an additional factor of control of the under looper thread which causes the take-up action to conform precisely with the movements of the under looper 44. It will be noted that as the overedge looper is retracted from its fully advanced position, shown in Fig. 11, in which the thread eyes 186, 188 are in alignment with the stationary thread guides 180, 190, the thread eyes are moved out of alignment with the fixed guides, and are at the same time gradually differentiated with relation to one another, this movement continuing with a corresponding increase in the take-up action upon the under looper thread until the overedge looper 46 reaches its fully retracted position of Fig. 7. By appropriately forming or locating the projections of the looper lever 48 and arm 96 and the thread guiding apertures therein, and by proper adjustment of eyelet 178, it is possible to provide a very accurately controlled take-up action for the under looper thread at the critical points of the cycle.

Figs. 15 and 16 of the drawings, illustrate a different set-up of the sewing instrumentalities in which the overedge looper member 45, which has been substituted for the thread carrying looper 46, is of the spreader type. With this set-up of the sewing mechanism, a two-thread overedge stitch is formed with a needle thread and an under looper thread. It is the function of the overedge looper to engage and carry the loop of under looper thread over the edge of the work into position to be engaged by the descending needle. The movements imparted to the overedge looper spreader 45 are, however, identical with those imparted to the thread carrying overedge looper 46, so that the operation of the control and take-up devices for the under looper thread remains unchanged.

Features of construction of the machine which relate to the lubrication of the main drive shaft 38, the eccentrics, and eccentric straps driven therefrom as shown generally in Fig. 3 of the drawings, form the subject matter of an application for Letters Patent now pending in the United States Patent Office, and are, therefore, not here particularly described and claimed.

While an illustrative form of the invention has been described in considerable detail, it will be understood that numerous changes in the construction and arrangement of the several parts and in the general application of the invention may be made, without departing from its principles and scope. The terms and expressions used herein have been employed as terms of description and not of limitation.

What is claimed is:

1. In an overedge sewing machine, a needle, an under looper mechanism having oscillatory parts including a thread carrying under looper, an overedge looper mechanism having oscillatory parts including an overedge looper, means for actuating said needle and looper mechanisms in timed relation to form a stitch, and thread take-up devices associated with said thread carrying under looper consisting solely of stationary thread guides, and a plurality of movable guiding means supported from the oscillatory parts of said overedge looper mechanism and guiding means on said under looper arranged to engage said thread at progressive points in its path in such manner that the relative movements of said overedge looper mechanism and of said under looper are effective to take up the thread.

2. In an overedge sewing machine, a needle, an under looper mechanism having oscillatory parts including a thread carrying under looper, an overedge looper mechanism having oscillatory parts including an overedge looper, actuating means for oscillating said needle and loopers between advanced and retracted positions timed to move the overedge looper to a fully retracted position when the under looper is advancing and to a fully advanced position when the under looper is retracting, and thread take-up devices for said under looper consisting of stationary thread guides, a plurality of movable guides supported from oscillatory parts of the overedge looper mechanism including at least one guide carried by the overedge looper itself, and a guide on the under looper, said guides being arranged in such a manner as to effect a maximum take-up of the thread at each limit of movement of the overedge looper, one of said movable guides being adjustable to vary its take-up effect.

3. In an overedge sewing machine, a needle, an under looper mechanism including a thread carrying under looper, an overedge looper mechanism including an overedge looper, a supporting stud and an arm therefrom pivotally connected with said overedge looper intermediate its length, actuating means for imparting oscillatory movements to said needle and loopers between advanced and retracted positions in timed relation to form a stitch, including an actuating connection with the overedge looper, thread take-up devices for the under looper thread including adjacently disposed thread guides on said arm and on said overedge looper, and stationary thread guides cooperating therewith from which the thread passes to the under looper, said movable thread guides being arranged for a differential movement away from said stationary guides as the overedge looper is retracted to effect a maximum take-up of the under looper thread for the fully retracted position of the overedge looper.

4. In an overedge sewing machine, a needle, an under looper mechanism including a thread carrying under looper, an overedge looper mechanism including an overedge looper, a supporting stud and an arm therefrom pivotally connected with said overedge looper intermediate its length, actuating means for imparting oscillatory movements to said needle and loopers between advanced and retracted positions in timed relation to form a stitch including an actuating connection timed to move the overedge looper to its retracted position while the under looper is advancing and to its advanced position while the under looper is retracting, thread take-up devices for said under looper thread consisting of an adjustable take-up thread guide offset on said stud, and stationary thread guides cooperating therewith to effect a maximum take-up of the under looper thread at the limit of the advancing movement of the overedge looper, and take-up thread guides on said arm and on said overedge looper, and stationary thread guides cooperating therewith to effect a maximum take-up of said under looper thread for the fully retracted position of the overedge looper.

5. In an overedge sewing machine, a needle, an under looper mechanism including a thread carrying under looper, an overedge looper mechanism including an overedge looper, an upper supporting stud and an arm therefrom pivotally connected with said overedge looper intermediate its length, a lower supporting stud and an arm therefrom pivotally connected with said overedge looper, means for imparting oscillatory movements to said needle and loopers between advanced and retracted positions in timed relation to form a stitch, including a connection for oscillating said lower stud, and under looper thread take-up devices comprising a take-up thread guide offset on said upper supporting stud with cooperating stationary thread guides at opposite sides thereof, and take-up thread guides adjacent one another on said upper arm and overedge looper with cooperating stationary thread guides at opposite sides thereof from which the thread passes to the under looper.

6. In an overedge sewing machine, a needle, an under looper mechanism including a thread carrying under looper, an overedge looper mechanism including an overedge looper, an upper supporting stud and an arm therefrom pivotally connected with said overedge looper intermediate its length, a lower supporting stud and an arm therefrom pivotally connected with said overedge looper, means for imparting oscillatory movements to said needle and loopers between advanced and retracted positions timed to move the overedge looper to a fully retracted position when the under looper is advancing, and to a fully advanced position when the under looper is retracting, and thread take-up devices for said under looper thread consisting of a take-up thread guide offset on said upper stud, and stationary thread guides cooperating therewith to effect a maximum take-up of the under looper thread at the limit of the advancing movement of the overedge looper, and adjacently disposed take-up thread guides on said upper arm and on said overedge looper and stationary thread guides cooperating therewith, said adjacently disposed thread guides being arranged for differential movement away from the cooperating stationary guides to effect a maximum take-up of the under looper thread for the fully retracted position of the overedge looper.

7. In an overedge sewing machine, a needle, an under looper mechanism including a thread carrying under looper, an overedge looper mechanism including an overedge looper, a supporting stud and an arm therefrom pivotally connected with said overedge looper intermediate its length, actuating means for imparting oscillatory movements to said needle and loopers between advanced and retracted positions in timed relation to form a stitch, and thread take-up devices for said under looper thread consisting of a take-up thread guide offset on said stud and stationary thread guides cooperating therewith to effect a maximum take-up of the under looper thread at the limit of the advancing movement of the overedge looper, supporting means on which said take-up thread guide is adjustable on said stud, and differentially movable take-up thread guides on said arm and on said overedge looper, and stationary thread guides cooperating therewith to effect a maximum take-up of said under looper thread for the retracted position of the overedge looper.

8. In an overedge sewing machine, a needle, a thread carrying under looper, an overedge looper, an oscillatory supporting stud and an arm therefrom pivotally connected with the overedge looper intermediate its length, means for imparting oscillatory movements to said needle, under looper and overedge looper to form a stitch, including an actuating connection for imparting upward and overedge swinging movements to said overedge looper, and thread take-up devices for said under looper thread comprising thread guides on said stud and stationary guides cooperating therewith rendered operative by the oscillatory movement of said stud to each limit of its movement to take up the under looper thread.

9. In an overedge sewing machine, a straight eye needle, an overedge looper, a thread carrying under looper, supporting and actuating means for imparting oscillatory movements to the needle, overedge looper and under looper to form a stitch comprising an overhead rearwardly extending drive shaft, a crank connected to drive the needle, upper and lower supporting studs and upper and lower arms therefrom pivotally connected with intermediate and lower end portions respectively of the overedge looper, an overedge looper eccentric and an eccentric strap connected to oscillate said lower stud, an under looper eccentric, an eccentric strap, a lever and a link providing a toggle connection for actuating said under looper with a substantial period of dwell in its retracted position, and take-up devices for the under looper thread comprising a take-up thread guide offset on said upper stud, and stationary guides at each side thereof to control the take-up of the thread for one limit of movement of the overedge looper, and adjacently located thread guides on the upper arm and overedge looper and stationary thread guides at each side thereof differentially movable to control the take-up of the thread for the other limit of movement of the overedge looper.

10. In an overedge sewing machine, a needle, an under looper mechanism including a thread carrying under looper, an overedge looper mechanism including an overedge looper, a drive shaft, supporting and actuating connections for the overedge looper consisting of an upper supporting stud and an arm therefrom pivotally connected with said overedge looper intermediate its length, a second stud and an arm therefrom connected with the overedge looper, an eccentric on said shaft and a strap connected to oscillate said latter stud, actuating connections for the under looper including an eccentric on said shaft, a strap, an actuating lever and a link forming a toggle connection with the under looper, and thread guiding and control means for said under looper thread including a thread tension, a take-up thread guide adjustable on said upper stud, and cooperating stationary thread guides at opposite sides thereof, and differentially movable take-up thread guides on said upper arm and overedge looper, and a pair of stationary thread guides cooperating therewith.

11. In an overedge sewing machine, a needle, an under looper mechanism including an under looper, an overedge looper mechanism including an overedge looper, an upper supporting stud and an arm therefrom pivotally connected with said overedge looper intermediate its length, a lower stud and an arm therefrom pivotally connected with the overedge looper, actuating means for imparting oscillatory movements to the needle and loopers in timed relation including a drive shaft, an under looper actuating eccentric on the drive shaft, and a strap connected to oscillate said lower stud, and means for adjusting said overedge looper toward and away from the needle comprising a supporting block having journal bearings for said studs, a guideway on which said block is adjustable to move the overedge looper toward and away from the needle, and means for securing the block in adjusted position.

12. In an overedge sewing machine a main frame, a needle, an overedge looper adapted to cooperate with said needle, means for operating said needle and looper to carry the same into and out of close cooperative relation, said means including a pair of spaced arms rockable about spaced pivots and connected with said looper at spaced points for imparting thereto combined bodily and turning movements, and means for adjusting said looper in relation to said needle comprising a block arranged to support said spaced pivots in predetermined relation, said block being shiftable on said frame and arranged to be clamped in a desired set position thereon.

13. In an overedge sewing machine, a needle, an under looper mechanism including a thread carrying under looper, an overedge looper mechanism including an overedge looper, supporting means for the overedge looper comprising an upper supporting stud and an arm therefrom pivotally connected with said overedge looper intermediate its length, a lower supporting stud and an arm therefrom pivotally connected with said overedge looper, means for imparting oscillatory movements to said needle and loopers between advanced and retracted positions in timed relation to form a stitch including a connection for oscillating said lower stud, a supporting block having journal bearings for said studs, a guideway on which said block is movable for adjusting the overedge looper toward and away from the needle, means for securing the block in adjusted position, and under looper thread take-up devices consisting of a take-up thread guide offset on said upper stud, and stationary thread guides cooperating therewith to effect a maximum take-up of the under looper thread at the limit of the advancing movement of the overedge looper, differentially movable thread take-up guides on said upper arm and overedge looper, and cooperating thread guides fixed on said block at opposite sides of said differentially movable thread guides arranged to effect a maximum take-up of said under looper thread for the fully retracted position of the overedge looper.

CHARLES F. RUBEL.

REFERENCES CITED

The following references are of record in the file of this patent:

UNITED STATES PATENTS

| Number | Name | Date |
|---|---|---|
| 932,272 | Grieb | Aug. 24, 1924 |
| 2,096,932 | Anton | Oct. 26, 1937 |
| 2,133,229 | Rubel | Oct. 11, 1938 |
| 2,218,796 | Knaus et al. | Oct. 22, 1940 |
| 2,297,061 | Knaus | Sept. 29, 1942 |